(12) United States Patent
Yun et al.

(10) Patent No.: US 11,487,692 B2
(45) Date of Patent: Nov. 1, 2022

(54) SHIELD BOARD

(71) Applicant: Harmonic Bionics, Inc., Austin, TX (US)

(72) Inventors: Youngmok Yun, Austin, TX (US); Matthew Gutierrez, Austin, TX (US); Kalavati Bhashyam, Helotes, TX (US)

(73) Assignee: Harmonic Bionics, Inc., Austin, TX (US)

(*) Notice: Subject to any disclaimer, the term of this patent is extended or adjusted under 35 U.S.C. 154(b) by 0 days.

(21) Appl. No.: 17/132,269

(22) Filed: Dec. 23, 2020

(65) Prior Publication Data

US 2021/0209050 A1 Jul. 8, 2021

Related U.S. Application Data

(60) Provisional application No. 62/957,189, filed on Jan. 4, 2020.

(51) Int. Cl.
| | | |
|---|---|---|
| *H04L 12/10* | (2006.01) | |
| *G06F 13/40* | (2006.01) | |
| *G06F 13/42* | (2006.01) | |

(52) U.S. Cl.
CPC ...... *G06F 13/4068* (2013.01); *G06F 13/4282* (2013.01); *H04L 12/10* (2013.01)

(58) Field of Classification Search
CPC ... G06F 13/4068; G06F 13/4282; H04L 12/10
See application file for complete search history.

(56) References Cited

U.S. PATENT DOCUMENTS

| | | | |
|---|---|---|---|
| 2006/0074927 A1* | 4/2006 | Sullivan | G06F 16/10 |
| 2013/0218349 A1* | 8/2013 | Coogan | G06F 8/34 |
| | | | 700/275 |
| 2017/0117971 A1* | 4/2017 | Sipes, Jr. | G02B 6/4416 |
| 2019/0058675 A1* | 2/2019 | Schubert | H04L 47/34 |

OTHER PUBLICATIONS

Jiande Wu, Advanced Four-Pair Architecture With Input Current Balance Function for Power Over Ethernet (PoE) System, May 2013, IEEE, vol. 28, p. 2350, Section IV Subsection A (Year: 2013).*
Wikipedia, "Arduino," accessed Jan. 3, 2020, 17 pages total.
Wikipedia, "Automation," accessed Jan. 3, 2020, 30 pages total.
Ease, Crowd Supply, "An Arduino shield with EtherCAT communication capabilities to connect to the larger Arduino ecosystem," accessed Jan. 3, 2020, 5 pages total.

(Continued)

*Primary Examiner* — Henry Tsai
*Assistant Examiner* — Harry Z Wang
(74) *Attorney, Agent, or Firm* — Trop, Pruner & Hu, P.C.

(57) ABSTRACT

An embodiment includes a system comprising: a first shield board that includes first and second connectors; wherein the first connector of the first shield board is configured to communicate with a first connector of a second shield board via a cable; wherein the first shield board has connectors configured to directly couple to connectors of a first base board; wherein the first shield board is configured to communicate data and power to the second shield board via the first connector of the first shield board, the cable, and the first connector of the second shield board. Other embodiments are addressed herein.

10 Claims, 8 Drawing Sheets

(56) References Cited

OTHER PUBLICATIONS

EtherCAT® and Arduino, "EasyCat Shield for Arduino, Make your EtherCAT device in an easy way with the power of Arduino," accessed Dec. 20, 2019, 8 pages total.

EtherCAT Technology Group, "EtherCat—the Ethernet Fieldbus," accessed Jan. 3, 2020, 20 pages total.

Wintherground Fairlands, A World of Funmagineering, "Daisy Chaining Serial Connections," Dec. 2, 2012, 8 pages total.

Store, "Arduino Ethernet Shield 2 with PoE," accessed Dec. 20, 2019, 3 pages total, https://store.arduino.cc/usa/arduino-ethernet-shield-2-with-poe.

* cited by examiner

| Pin number | Pin name |
|---|---|
| 1 | TX+ |
| 2 | TX- |
| 3 | RX+ |
| 4 | 24 VDC |
| 5 | 24 VDC |
| 6 | RX- |
| 7 | DGND |
| 8 | DGND |

EtherCAT IN/OUT Connector Pinout

Pin1
YELLOW LED
X1/X2 EtherCAT IN/OUT RJ45 Connector
GREEN LED

SHIELD BOARD

CROSS-REFERENCE TO RELATED APPLICATION

This application claims priority to U.S. Provisional Patent Application No. 62/957,189 filed on Jan. 4, 2020 and entitled "SHIELD BOARD", the entire content of which is hereby incorporated by reference.

BACKGROUND

Development of new technologies may be fostered by use of hardware and software kits or systems that allow users of varying technological experiences to quickly leverage the hardware and software to create varied technological applications. Such kits may be available, for example, commercially in preassembled form or as do-it-yourself (DIY) kits. Such kits may include, for example, single-board microcontrollers and microcontroller kits for building digital devices. An example of such a system is an Arduino Uno board, available at https:***//store.arduino.cc/usa/arduino-uno-rev3.

Hardware systems may use a variety of microprocessors and controllers. The boards may be equipped with sets of digital and analog input/output (I/O) pins that may be interfaced to various expansion boards ('shields') or breadboards (for prototyping) and other circuits. The boards may feature serial communications interfaces, including Universal Serial Bus (USB) on some models, which are also used for loading programs from personal computers. The microcontrollers can be programmed using C and C++ programming languages.

Such systems provide a low-cost and easy way for novices and professionals to create devices that interact with their environment using sensors and actuators. Common examples of such devices include simple robots, thermostats and motion detectors.

Such systems may be used to quickly develop automation technology.

Automation is the technology by which a process or procedure is performed with minimal human assistance. Automation or automatic control is the use of various control systems for operating equipment such as machinery, processes in factories, boilers and heat-treating ovens, switching on telephone networks, steering and stabilization of ships, aircraft and other applications and vehicles with minimal or reduced human intervention.

Automation covers applications ranging from a household thermostat controlling a boiler, to a large industrial control system with tens of thousands of input measurements and output control signals. In control complexity, it can range from simple on-off control to multi-variable high-level algorithms.

In the simplest type of an automatic control loop, a controller compares a measured value of a process with a desired set value, and processes the resulting error signal to change some input to the process, in such a way that the process stays at its set point despite disturbances. This closed-loop control is an application of negative feedback to a system.

Automation has been achieved by various means including mechanical, hydraulic, pneumatic, electrical, electronic devices and computers, usually in combination. Complicated systems, such as modern factories, airplanes and ships typically use all these combined techniques. The benefit of automation includes labor savings, savings in electricity costs, savings in material costs, and improvements to quality, accuracy, and precision.

Various protocols exist to promote automation. EtherCAT (Ethernet for Control Automation Technology) is a real-time Industrial Ethernet technology. As addressed at https://***.ethercat.org/en/technology.html#1.1, the EtherCAT protocol, which is disclosed in the IEC standard IEC61158, is suitable for hard and soft real-time requirements in automation technology, in test and measurement and many other applications. The main focus during the development of EtherCAT was on short cycle times ($\leq 100$ µs), low jitter for accurate synchronization ($\leq 1$ µs) and low hardware costs.

The EtherCAT master sends a telegram that passes through each node. Each EtherCAT slave device reads the data addressed to it "on the fly", and inserts its data in the frame as the frame is moving downstream. The frame is delayed only by hardware propagation delay times. The last node in a segment (or drop line) detects an open port and sends the message back to the master using Ethernet technology's full duplex feature.

The EtherCAT master is the only node within a segment allowed to actively send an EtherCAT frame; all other nodes merely forward frames downstream. This concept prevents unpredictable delays and guarantees real-time capabilities.

The master uses a standard Ethernet Media Access Controller (MAC) without an additional communication processor. This allows a master to be implemented on any hardware platform with an available Ethernet port, regardless of which real-time operating system or application software is used. EtherCAT Slave devices use an EtherCAT Slave Controller (ESC) to process frames on the fly and entirely in hardware, making network performance predictable and independent of the individual slave device implementation.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

DETAILED DESCRIPTION

Reference will now be made to the drawings wherein like structures may be provided with like suffix reference designations. In order to show the structures of various embodiments more clearly, the drawings included herein are diagrammatic representations of structures, such as circuit structures. Thus, the actual appearance of the fabricated integrated circuit structures, for example in a photomicrograph, may appear different while still incorporating the claimed structures of the illustrated embodiments. Moreover, the drawings may only show the structures useful to understand the illustrated embodiments. Additional structures known in the art may not have been included to maintain the clarity of the drawings. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Phrases such as "comprising at least one of A and B" include situations with A, B, or A and B.

Embodiments provide an accessory board that couples to base boards to quickly promote technological innovations.

Exhibit A was disclosed in U.S. Provisional Patent Application No. 62/957,189 filed on Jan. 4, 2020 and entitled "SHIELD BOARD". The content of Exhibit A is hereby incorporated by reference. Exhibit A provides an overview of one or more embodiments.

Exhibit B was disclosed in U.S. Provisional Patent Application No. 62/957,189 filed on Jan. 4, 2020 and entitled "SHIELD BOARD". The content of Exhibit B is hereby incorporated by reference. Exhibit B describes one or more embodiments.

Exhibit C was disclosed in U.S. Provisional Patent Application No. 62/957,189 filed on Jan. 4, 2020 and entitled "SHIELD BOARD". The content of Exhibit C is hereby incorporated by reference. Exhibit C provides schematics for one or more embodiments. Exhibit B is 17 pages long. Exhibit C was not labeled as "Exhibit C" but came immediately after Exhibit B. Exhibit C disclosed schematics labeled "SPI Interface for Variable Voltage Level", "Power Management", "Connectors", and "LEDs".

Embodiments disclosed in FIGS. 1-7 are now addressed.

A system comprises a first base printed circuit board (PCB) (111) and a first shield PCB (101), the first shield PCB including first (141) and second (142) RJ45 connectors. The system further includes a second base PCB (112) and a second shield PCB (102), the second shield PCB including first (143) and second (144) RJ45 connectors. The system further includes an Ethernet cable (138) that couples the first RJ45 connector of the first shield PCB to the first RJ45 connector of the second shield PCB. The first base PCB and the first shield PCB have pinouts that correspond to each other. The second base PCB and the second shield PCB have pinouts that correspond to each other. The first shield PCB is configured to communicate data (197) with and deliver power (197') to the second shield PCB via the first RJ45 connector of the first shield PCB, the Ethernet cable, and the first RJ45 connector of the second shield PCB.

In an embodiment the first base PCB includes an Arduino Uno PCB.

In an embodiment the data to be communicated between the first and second shield PCB s is formatted to an EtherCAT protocol. The first shield PCB is configured to communicate additional data (198) with the first base PCB via a serial peripheral interface (SPI) protocol, and the second shield PCB is configured to communicate further data (196) with the second base PCB via the SPI protocol.

The SPI protocol is very light and universal for many embedded systems. In contrast, a program for EtherCAT communication is very heavy (computationally expensive) and not available for many embedded systems. Because of these characteristics, locating all EtherCAT-related portions in the shield makes an embodiment computationally more powerful and more compatible with other systems.

An embodiment comprises a data packet, where the additional data (198) to be communicated between the first shield PCB and the first base PCB includes the data packet.

An embodiment comprises an EtherCAT master computing node (104) configured to communicate another data (199) with the first shield PCB via the second RJ45 connector (142) of the first shield PCB. Node 104 may communicate with other nodes, such as node 102, via node 101. An embodiment comprises the another data (199) to be communicated between the EtherCAT master computing node and the first shield PCB includes another data packet. In an embodiment the data packet is unequal to the another data packet.

Figure 6:
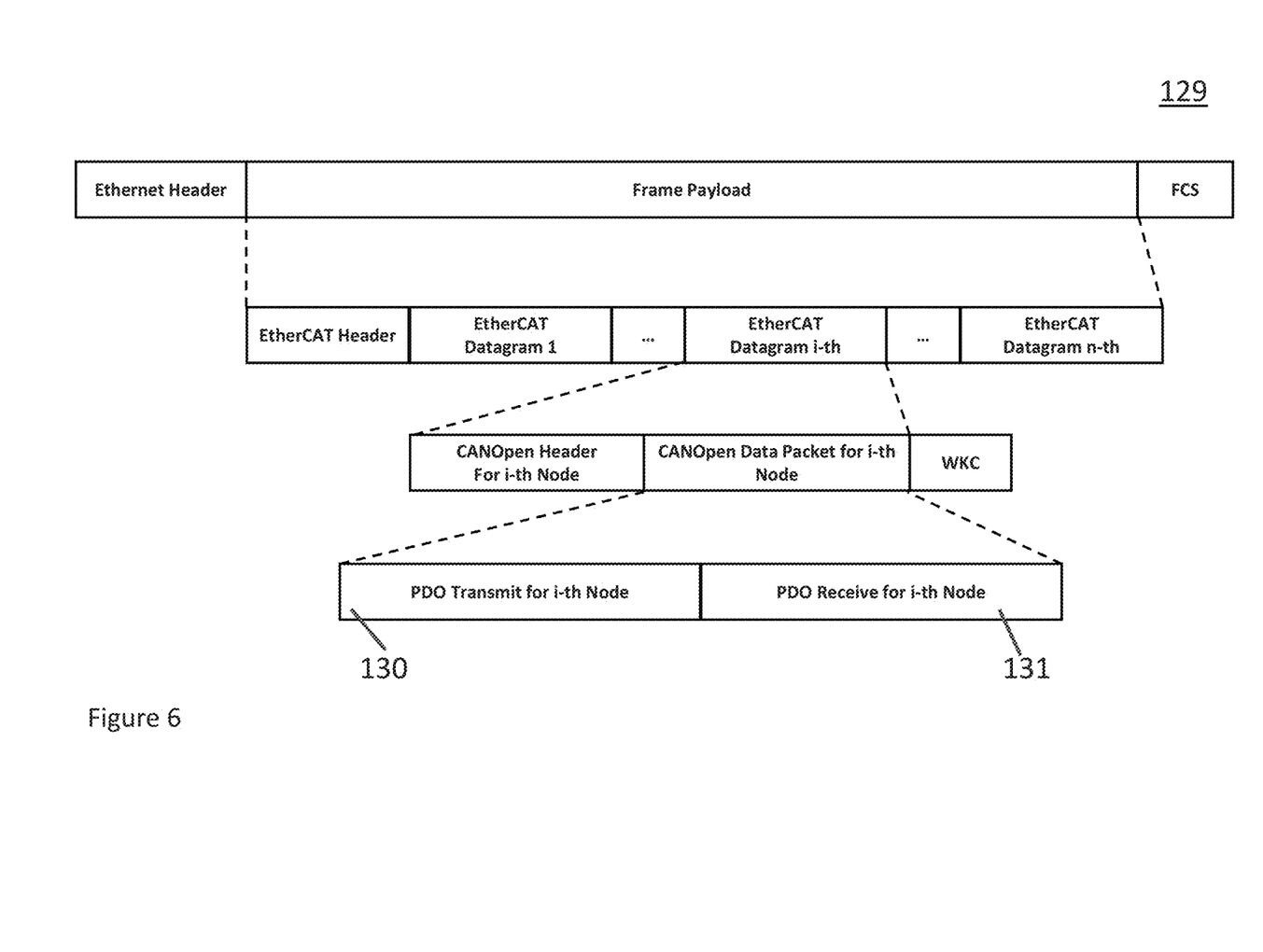
FIG. 6 includes a data structure in an embodiment of the invention.

An embodiment includes shield 101. Shield 101 includes packet processor 121, memory 122 to contain, for example, Process Data Objects (PDO), and communication manager for Base Board 123. Regarding processor 121, an EtherCAT packet 129 is received at the Ethernet physical layer (Ethernet Phy) of IN Port 124. FIG. 6 includes an embodiment of an EtherCAT packet. The EtherCAT packet 129 is read by EtherCAT Slave Controller 126 and then the packet 129 is decoded to extract Transmit PDO 130 and save the PDO 130 in memory 122. Also, Receive PDO 131 is stored in memory 122 and is encoded into another EtherCAT Packet 132 and sent to the Ethernet Phy of OUT Port 125 by EtherCAT Slave Controller 126.

Thus, communications 129 and 132 may each be formatted in the same protocol (EtherCAT) but have unequal content (considering communication 132 may have new Receive PDO from board 111). Communication 133 (both going from board 101 to board 111 and from board 111 to board 101) may be formatted differently (e.g., SPI) from communications 129, 132 (e.g., EtherCAT). Further, communications 133 may include streamlined content when compared to communications 129, 132. For example, communications 133 may include elements 130, 131 with much of the remainder of packet 129 not included. For example, when communication 133 is communicated from board 101 to board 111 content 130 may be included (but not content 131 or various portions of an EtherCAT packet). For example, when communication 133 is communicated to board 101 from board 111 content 131 may be included (but not content 130 or various portions of an EtherCAT packet).

Regarding memory 122, the memory stores Transmit PDO 130 and Receive PDO 131. The PDOs 130, 131 are read/written by the EtherCAT packet processor 121 and Communication manager for Base Board 123.

Regarding Communication manager for Base Board 123, in an embodiment the Communication manager for Base Board 123 receives a trigger (often called interrupt) to start a communication between shield 101 and Base Board 111. The communication protocol can be, for example, SPI, I2C, UART, and others. Once the communication is triggered, "Communication manager for Base Board" 123 exchanges a PDO packet 133 between shield 101 and Base Board 111.

Figure 1:
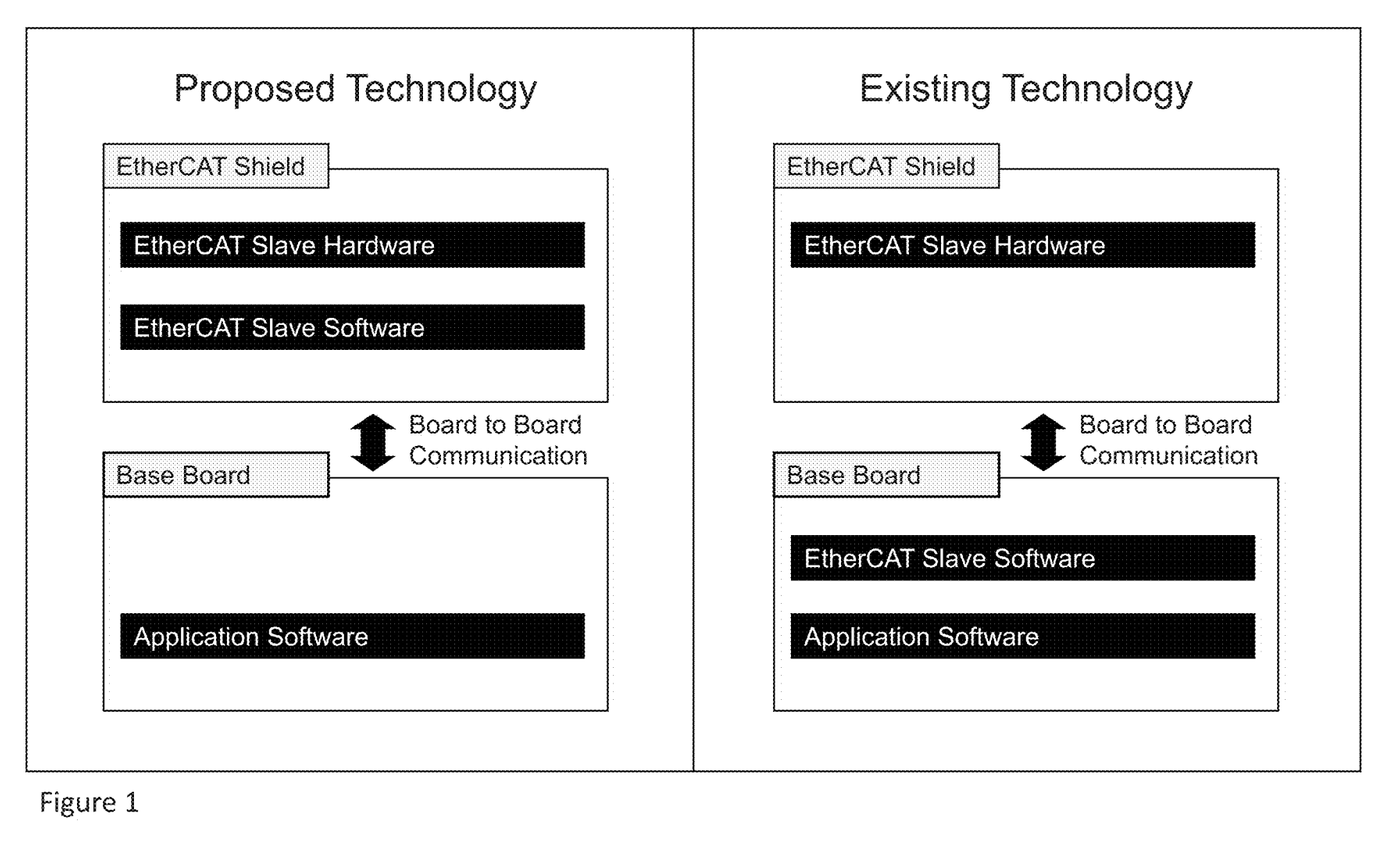
FIG. 1 compares embodiments of the invention with conventional systems.
Figure 2A:
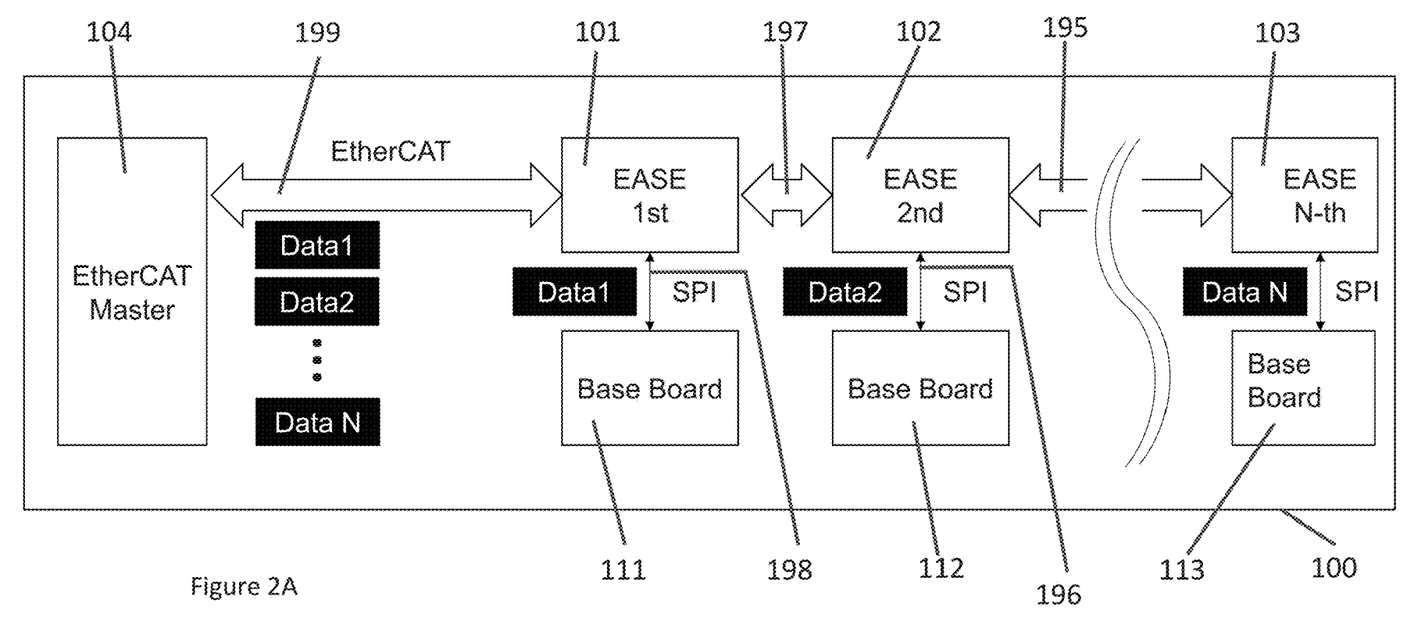
FIG. 2A includes a system, including base and shield boards, in an embodiment of the invention.
Figure 2B:
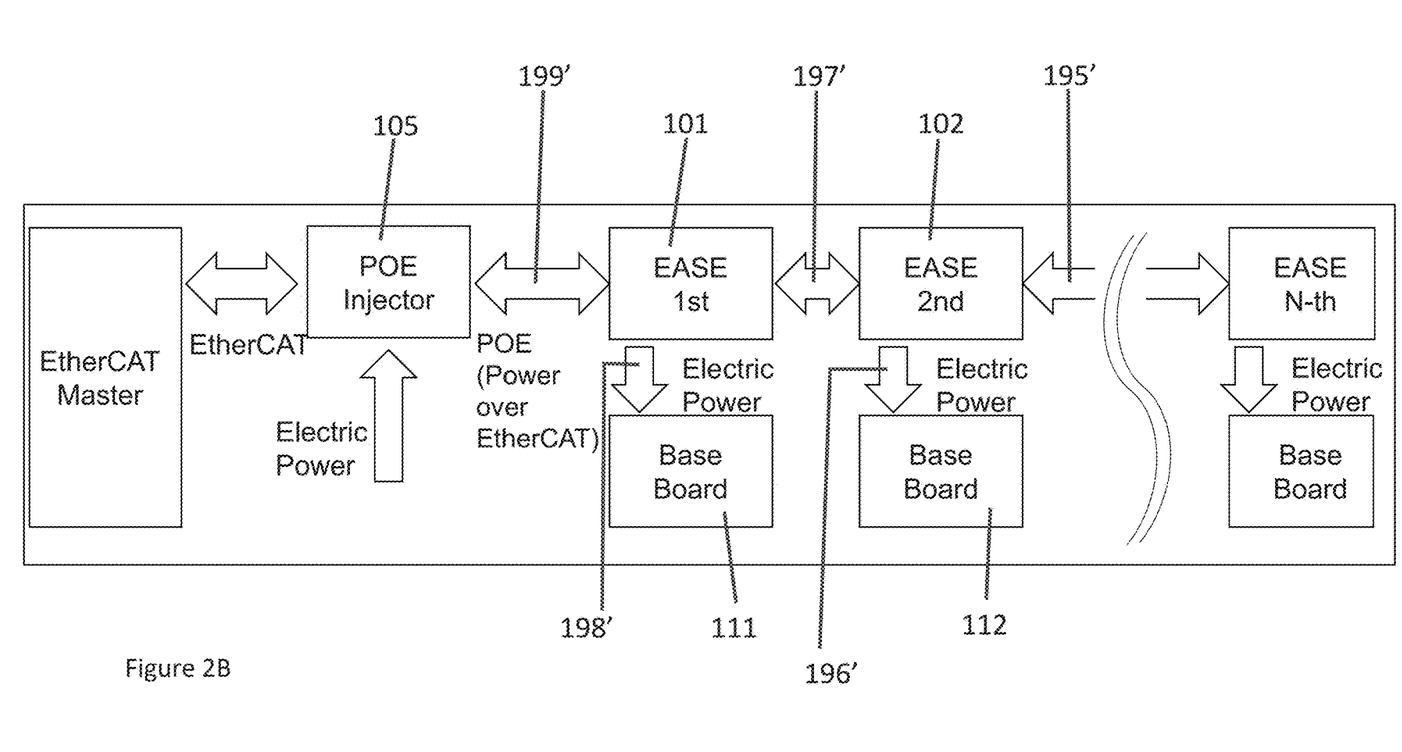
FIG. 2B includes a system, including base and shield boards, in an embodiment of the invention.

By handling packet 129 in the above manner much of the computing is offloaded from board 111 and onto board 101. Doing so frees controller 128 of board 111 for other tasks, such as processing sensor input from a robotic sensor that is coupled to board 111. For example, in conventional systems a shield may deliver an EtherCAT packet to base board 111, instead of the decoded PDO of communication 133 (where the decoded PDO 133 is far less computationally expensive than a packet, such as packet 129). This may be because the conventional shield lacks decoder/encoder 127, memory 122, and/or communication manager for base board 123. As another example, FIG. 1 compares existing technology and an embodiment. Specifically, the location of the EtherCAT Slave Software enabling EtherCAT for Base Board is a critical difference. The location of EtherCAT Slave Software is in EtherCAT Shield for an embodiment but in the Base Board for existing technologies.

Thus, in an embodiment the computational power of Base Board is not shared with EtherCAT Slave Software. Its computational power is solely used by Application Software. On the contrary, in the conventional technology, the computational power of the Base Board needs to be shared between EtherCAT Slave Software and Application Software. Also, the EtherCAT Slave Software in conventional technology has been written for a specific Base Board. However, in an embodiment the EtherCAT Slave Software is in EtherCAT Shield and communicates with Base Board with a Board-to-Board Communication Method, which is universal for most different types of Base Boards. Thus, using the board-to-board communication increase the compatibility between EtherCAT Shield and Base Board.

Also, as shown in FIG. 6, an embodiment uses a generic data packet for communication of EtherCAT and SPI. Since the packet is generic (e.g., elements 130 and/or 131), which are 16-bit unsigned integers, the interpretation of the data packet occurs at the end points of EtherCAT Master and Base Board. This interpretation with a generic data allows the users to use an embodiment for universal purposes. In contrast, if the packet was pre-determined for a specific purpose, it is difficult to use the packet for other purposes.

In an embodiment the first shield PCB includes an EtherCAT decoder/encoder. In an embodiment the first shield includes memory to store content decoded by the EtherCAT decoder/encoder. In an embodiment the first shield includes memory to store content encoded by the EtherCAT decoder/encoder.

An embodiment comprises a Power Over EtherCAT (POE) injector (105) configured to deliver additional power (199') to the second RJ45 connector of the first shield PCB. In an embodiment the POE injector is configured to deliver the power (197') to the first RJ45 connector of the second shield PCB. In an embodiment the POE injector is configured to deliver further power (198') to the first base PCB via the first shield PCB. In an embodiment the POE injector is configured to deliver another power (196') to the second base PCB via the first and second shield PCBs.

In an embodiment, Power-over-EtherCAT system for shield 101 may include three major parts.

Figure 4:
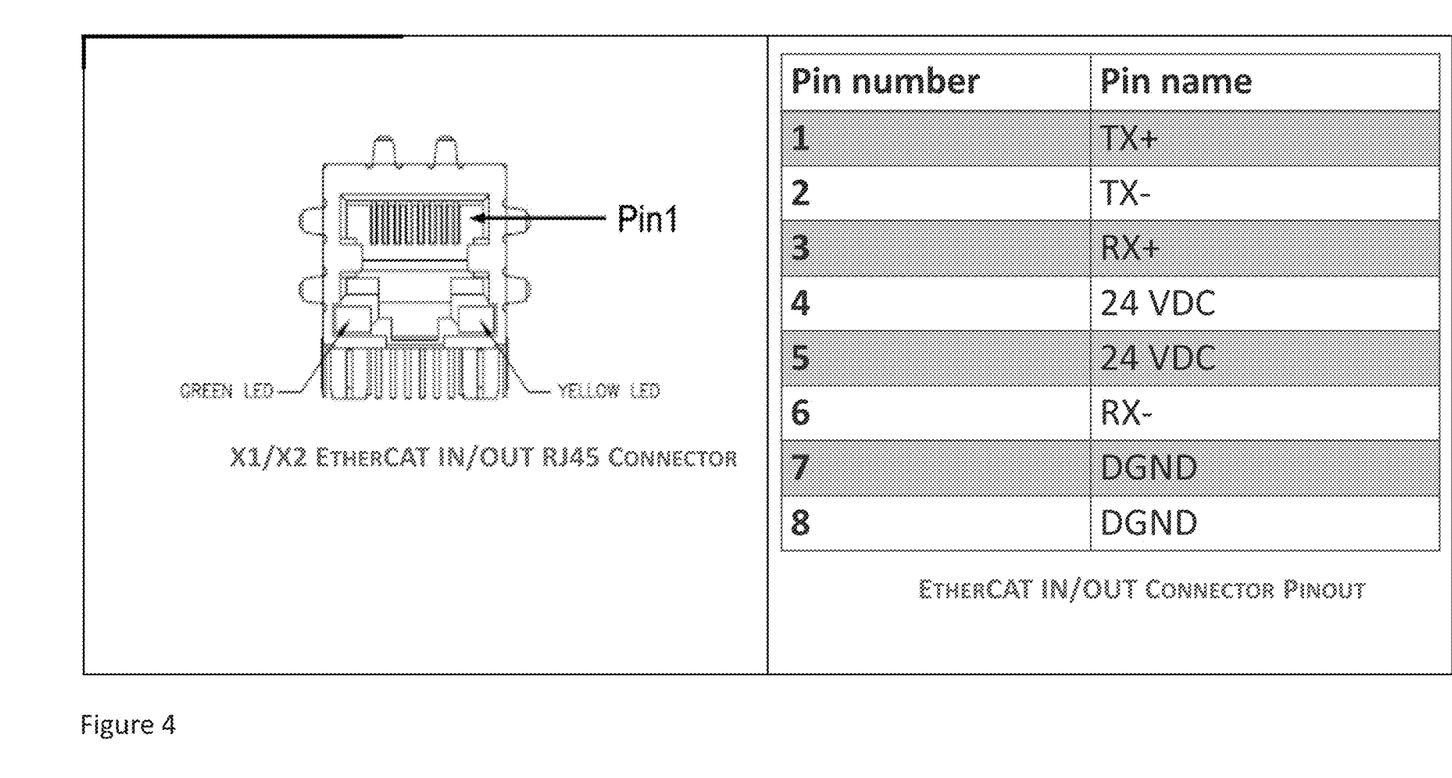
FIG. 4 includes a system for power distribution in an embodiment of the invention.
Figure 5:
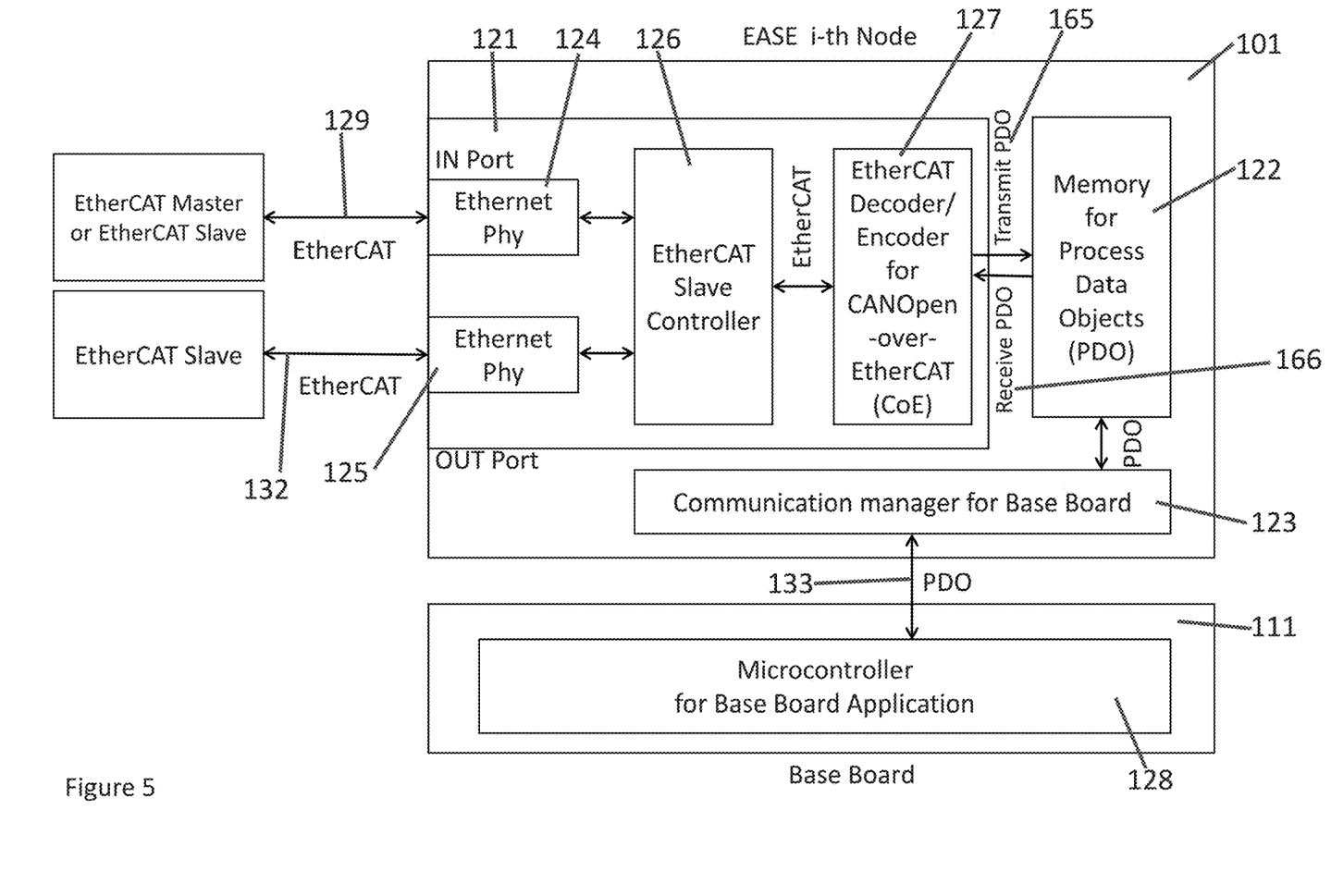
FIG. 5 includes a system, including base and shield boards, in an embodiment of the invention.

The first part includes the EtherCAT IN 142 and OUT 141 Ports. An embodiment of each port is depicted in FIG. 4. An RJ45 connector of EtherCAT IN and OUT Ports contains 8 pins respectively. 4 pins of each port are for the EtherCAT communication (e.g., pins 1, 2, 3, 6) and the other 4 pins (e.g., pins 4, 5, 7, 8) are for 24 VDC power supply. The EtherCAT IN Port is to receive the 24 VDC 199' and the EtherCAT communication 199 and the EtherCAT Out Port is to send the 24 VDC 197' and the EtherCAT communication 197. The pinout of the RJ45 is described in the table of FIG. 4.

Figure 3:
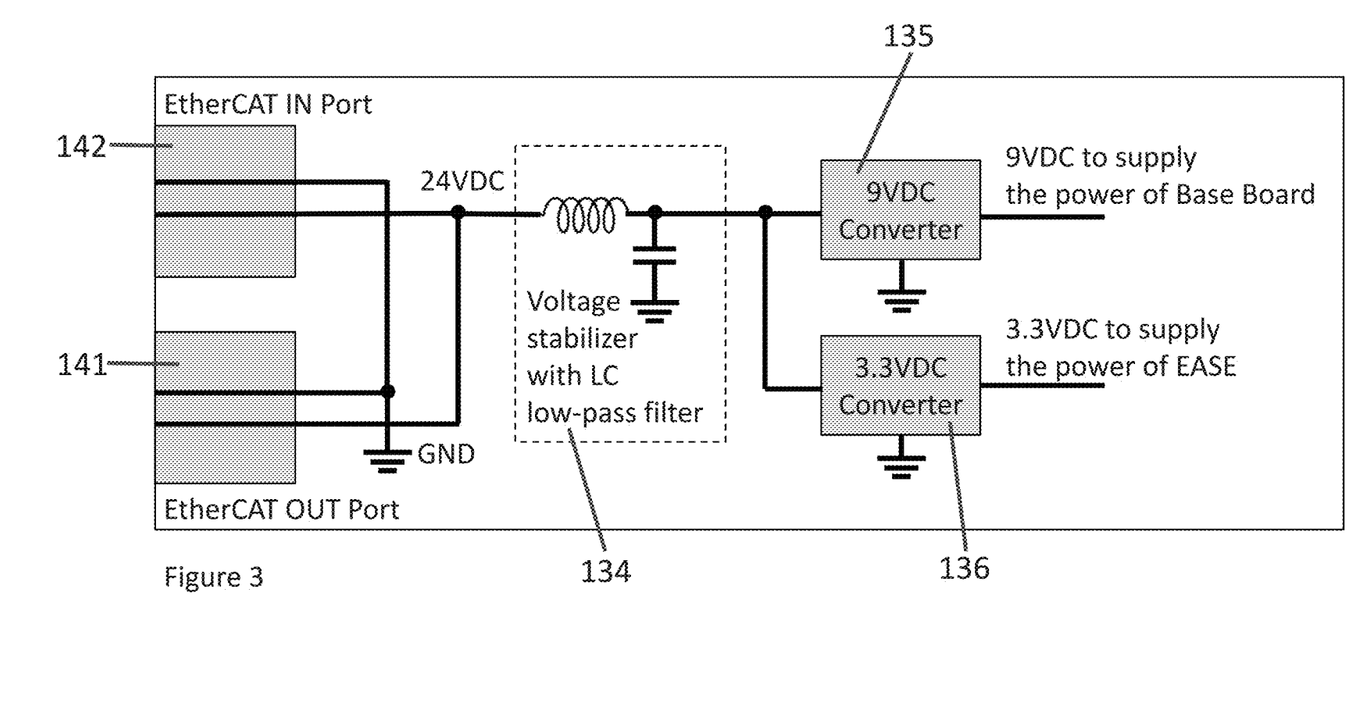
FIG. 3 includes a system for power distribution in an embodiment of the invention.

The second part of the Power-over-EtherCAT system for shield 101 is the voltage stabilizer 134 of FIG. 3. The received 24 VDC is stabilized by a LC lowpass filter circuit before power-supplying the shield components 121, 122, 123 and the Base Board 111 to prevent uprising high voltage that may damage the embedded system of boards 101, 111. This stabilizer also stabilizes the power supply of the next shield boards, such as downstream board 102 that receives power 197'.

The third part of the Power-over-EtherCAT system for shield 101 includes the power management unit (PMU). The PMU includes two DC-DC voltage converters 135, 136 that respectively supply power to boards 101, 111.

In existing technology, the Base Board and its shield have been powered by an external power source, which need additional power cables. However, in an embodiment one cable is used for both communication and power supply, called Power-over-EtherCAT. With the POE technology, one cable supplies the power of both EtherCAT shields and Base Boards. Thus, the electric power of Base Board and Shields are supplied by the communication cable with Power-over-EtherCAT technology in an embodiment. This wire topology reduces the number of required power cables and power outlets.

In an embodiment a system comprises a third base PCB (113) and a third shield PCB (103), the third shield PCB including first (145) and second (146) RJ45 connectors. The system includes another Ethernet cable (132) that couples the second RJ45 connector (144) of the second shield PCB to the first RJ45 connector (145) of the third shield PCB. The third base PCB and the third shield PCB have pinouts that correspond to each other. The second shield PCB is configured to communicate data (195) with and deliver power (195') to the third shield PCB via the first RJ45 connector of the first shield PCB, the first and second RJ45 connectors of the second shield PCB, and the first RJ45 connector of the third shield PCB.

In an embodiment the first, second, and third shield PCBs are daisy-chained to one another.

In an embodiment the first, second, and third shield PCBs have equal hardware to each other; and the first, second, and third base PCBs have unequal hardware to each other. Of course, in some embodiments the first, second, and third base PCBs have equal hardware to each other.

Figure 7:
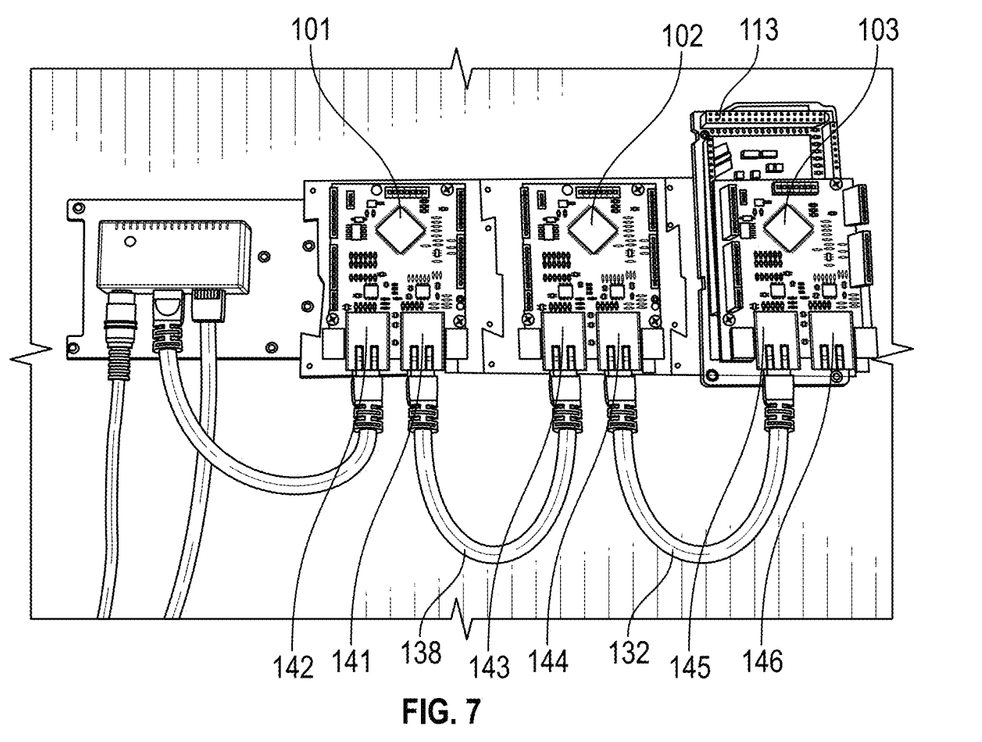
FIG. 7 includes a system, including base and shield boards, in an embodiment of the invention.

In an embodiment the first, second, and third shield PCBs have equal footprints to each other and at least two of the first, second, and third base PCBs have unequal footprints to each other. For example, FIG. 7 shows three shields 101, 102, 103 daisy-chained together. Each of the shields includes the same hardware. However, shields 101 and 102 are mated to two base boards that are not visible due to the perspective of FIG. 7. The third base board 113 is visible and is clearly of a different footprint than the base boards that are coupled to shields 101 and 102. Thus, while "the third base PCB and the third shield PCB have pinouts that correspond to each other", FIG. 7 shows this does not necessarily mean the entire pinouts of, for example, boards 103, 113 match each other or that the footprints of, for example, boards 103, 113 match each other.

Program instructions may be used to cause a general-purpose or special purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as (a) a computer program product that may include one or more machine readable media having stored thereon instructions that may be used to program a processing system or other electronic device to perform the methods or (b) at least one storage medium having instructions stored thereon for causing a system to perform the methods. The term "machine readable medium" or "storage medium" used herein shall include any medium that is capable of storing or encoding a sequence of instructions (transitory media, including signals, or non-transitory media) for execution by the machine and that cause the machine to perform any one of the methods described herein. The term "machine readable medium" or "storage medium" shall accordingly include, but not be limited to, memories such as solid- state memories, optical and magnetic disks, read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, as well as more exotic mediums such as machine-accessible biological state preserving or signal preserving storage. A medium may include any mechanism for storing, transmitting, or receiving information in a form readable by a machine, and the medium may include a medium through which the program code may pass, such as antennas, optical fibers, communications interfaces, and the like. Program code may be transmitted in the form of packets, serial data, parallel data, and the like, and may be used in a compressed or encrypted format. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

The description of the embodiments of the invention addressed herein (e.g., in the Exhibits A, B, C and or descriptions found in the claims) has been presented for the purposes of illustration and description. It is not intended to be exhaustive or to limit the invention to the precise forms disclosed. This description and the claims following include terms, such as left, right, top, bottom, over, under, upper, lower, first, second, etc. that are used for descriptive purposes only and are not to be construed as limiting. Persons skilled in the relevant art can appreciate that many modifications and variations are possible in light of the above teaching. Persons skilled in the art will recognize various equivalent combinations and substitutions for various components shown in the Figures. It is therefore intended that the scope of the invention be limited not by this detailed description, but rather by the claims appended hereto.

What is claimed is:

1. A system comprising:
   a robot including a sensor;
   a first base printed circuit board (PCB) coupled to the sensor;
   a first shield PCB, the first shield PCB including first and second RJ45 connectors;
   a second base PCB;
   a second shield PCB, the second shield PCB including first and second RJ45 connectors;
   an Ethernet cable that couples the first RJ45 connector of the first shield PCB to the first RJ45 connector of the second shield PCB;
   wherein (a)(i) the first base PCB and the first shield PCB have pinouts that correspond to each other, (a)(ii) the second base PCB and the second shield PCB have pinouts that correspond to each other;
   wherein (b)(i) the first shield PCB is to communicate data with and deliver power to the second shield PCB via the first RJ45 connector of the first shield PCB, the Ethernet cable, and the first RJ45 connector of the second shield PCB;
   wherein the first shield PCB includes: (c)(i) an EtherCAT decoder/encoder to decode EtherCAT packets into decoded process data objects (PDOs) and to encode PDOs into encoded EtherCAT packets; (c)(ii) memory to store the decoded PDOs and the encoded EtherCAT packets; and (c)(iii) EtherCAT slave software to read and modify the decoded EtherCAT packets before the modified EtherCAT packets are sent to an EtherCAT master computing node;
   wherein the first base PCB: (d)(i) includes no EtherCAT slave software; and (d)(ii) includes application software to process sensor input from the sensor.

2. The system of claim 1 wherein:
   the data to be communicated between the first and second shield PCBs includes an encoded EtherCAT packet;
   the first shield PCB is to (a) send a first PDO to the first base PCB via a serial peripheral interface (SPI) protocol, and (b) receive a second PDO from the first base PCB via the SPI protocol;
   the first PDO includes first data and the second PDO includes second data that is unequal to the first data;
   neither of the first or second PDOs is encoded and neither of the first or second PDOs includes a header;
   the first PDO is derived from the EtherCAT packet and is smaller than the EtherCAT packet;
   the EtherCAT decoder/encoder is to combine the second PDO with the EtherCAT packet before the EtherCAT packet is sent to the second shield PCB from the first shield PCB.

3. The system of claim 2 comprising the EtherCAT master computing node to communicate EtherCAT packets with the first shield PCB via the second RJ45 connector of the first shield PCB.

4. The system of claim 2 comprising a Power Over EtherCAT (POE) injector to deliver additional power to the second RJ45 connector of the first shield PCB.

5. The system of claim 4 wherein the POE injector is to:
   deliver the power to the first RJ45 connector of the second shield PCB;
   deliver further power to the first base PCB via the first shield PCB;
   deliver another power to the second base PCB via the first and second shield PCBs.

6. The system of claim 1 comprising:

a third base PCB;

a third shield PCB, the third shield PCB including first and second RJ45 connectors;

another Ethernet cable that couples the second RJ45 connector of the second shield PCB to the first RJ45 connector of the third shield PCB;

wherein (a)(i) the third base PCB and the third shield PCB have pinouts that correspond to each other;

wherein (b)(i) the second shield PCB is to communicate data with and deliver power to the third shield PCB via the first RJ45 connector of the first shield PCB, the first and second RJ45 connectors of the second shield PCB, and the first RJ45 connector of the third shield PCB.

7. The system of claim 6 wherein:

the first, second, and third shield PCBs are daisy-chained to one another;

the first, second, and third shield PCBs have equal hardware to each other;

the first, second, and third base PCBs have unequal hardware to each other.

8. The system of claim 6 wherein:

the first, second, and third shield PCBs have equal footprints to each other;

at least two of the first, second, and third base PCB s have unequal footprints to each other.

9. The system of claim 2, wherein the first base PCB is not configured to receive and process EtherCAT packets.

10. The system of claim 2, wherein the first shield PCB comprises an EtherCAT slave controller.

* * * * *

UNITED STATES PATENT AND TRADEMARK OFFICE
CERTIFICATE OF CORRECTION

PATENT NO. : 11,487,692 B2
APPLICATION NO. : 17/132269
DATED : November 1, 2022
INVENTOR(S) : Youngmok Yun, Matthew Gutierrez and Kalavati Bhashyam Page 1 of 1

It is certified that error appears in the above-identified patent and that said Letters Patent is hereby corrected as shown below:

In the Claims

Column 9,
Line 25, Claim 8, "PCB s", should be --PCBs--.

Signed and Sealed this
Thirteenth Day of December, 2022

Katherine Kelly Vidal
*Director of the United States Patent and Trademark Office*